US008360374B2

(12) United States Patent
Truitt

(10) Patent No.: US 8,360,374 B2
(45) Date of Patent: Jan. 29, 2013

(54) ADJUSTABLE FRAME TO SUPPORT FLEXIBLE BODIES

(76) Inventor: John Truitt, Pittsburg, TX (US)

( * ) Notice: Subject to any disclaimer, the term of this patent is extended or adjusted under 35 U.S.C. 154(b) by 123 days.

(21) Appl. No.: 12/870,741

(22) Filed: Aug. 27, 2010

(65) Prior Publication Data

US 2012/0049014 A1 Mar. 1, 2012

(51) Int. Cl.

| | |
|---|---|
| ***F16M 11/38*** | (2006.01) |
| ***F16M 11/00*** | (2006.01) |
| ***F16M 11/32*** | (2006.01) |
| ***F16M 13/00*** | (2006.01) |
| ***F16M 11/26*** | (2006.01) |
| ***F16M 11/16*** | (2006.01) |
| ***E06C 1/00*** | (2006.01) |

(52) U.S. Cl. ..... 248/171; 248/434; 248/166; 248/163.1; 248/588; 248/169; 248/188.5; 248/188; 248/95; 182/152; 182/153; 182/154; 182/155; 182/156; 182/162

(58) Field of Classification Search .................. 248/171, 248/434, 168, 165, 166, 163.1, 588, 435, 248/169, 440.1, 440, 188.5, 188.8, 164, 188, 248/188.91, 95; 182/152–156, 162
See application file for complete search history.

(56) References Cited

U.S. PATENT DOCUMENTS 63,383 A 4/1867 Hanks
314,986 A * 4/1885 Aenis ............................ 451/360
1,614,818 A * 1/1927 Basford ......................... 248/166
3,190,406 A * 6/1965 Usher et al. ...................... 52/646
3,289,854 A 12/1966 Kauffman
3,354,596 A * 11/1967 Schafer ............................ 52/646
3,451,557 A 6/1969 Stoddard
4,593,822 A 6/1986 Yeaney et al.
4,641,676 A 2/1987 Lynch
4,748,993 A 6/1988 Llewellyn
4,921,195 A 5/1990 Clark et al.
4,974,806 A 12/1990 Matern
5,080,237 A 1/1992 Hefner
5,102,076 A 4/1992 North et al.
5,188,244 A 2/1993 Hollstegge
5,405,018 A * 4/1995 Anthrop, Jr. ................. 211/41.9
5,421,356 A 6/1995 Lynch
5,538,050 A 7/1996 Galdon
5,620,272 A * 4/1997 Sheng .............................. 403/96
5,641,137 A 6/1997 Collier
(Continued)

*Primary Examiner* — Terrell McKinnon
*Assistant Examiner* — Christopher Garft
(74) *Attorney, Agent, or Firm* — Egbert Law Offices, PLLC

(57) ABSTRACT

The present invention provides a frame having variable dimensions, comprising a plurality of telescoping legs arranged in first and second pairs, with each leg of said first pair being rotatably coupled together and each leg of said second pair being rotatably coupled together; and a scissor link mechanism coupled between the legs of said first and second pairs to vary a length of said plurality of legs in response to a distance between said first and second pairs varying. In one embodiment one end of each of said legs of said first pair is rotatably coupled together and one end of each of said legs of said second pair are rotatably coupled together. In this manner, the dimensions of the frame may be varied to accommodate support of a flexible body, such as a plastic bag, paper sack, fabric sack and the like to provide the same with a desired volume and/or an opening of the same with desired dimensions. Specifically, the length of the legs, the angle therebetween and the distance between the first and second pairs may be such as to provide a desired volume of structure support to the flexible membrane from amongst range of volumes that the flexible material can support.

5 Claims, 6 Drawing Sheets

U.S. PATENT DOCUMENTS

| | | | | |
|---|---|---|---|---|
| 5,794,792 | A | 8/1998 | Convertino | |
| 5,918,749 | A | 7/1999 | Pille et al. | |
| 6,243,967 | B1 | 6/2001 | Dovolas | |
| 6,367,492 | B1 | 4/2002 | Brown | |
| 6,419,198 | B1 * | 7/2002 | Einav | 248/346.07 |
| 6,557,567 | B2 | 5/2003 | Mood | |
| 6,860,454 | B1 * | 3/2005 | Gronowicz, Jr. | 248/71 |
| 6,923,416 | B1 * | 8/2005 | Hsieh | 248/431 |
| 6,983,754 | B1 | 1/2006 | Anderson et al. | |
| 7,368,647 | B2 * | 5/2008 | Hsieh | 84/327 |
| 2004/0262466 | A1 * | 12/2004 | Blattner | 248/166 |
| 2007/0095989 | A1 * | 5/2007 | Spater et al. | 248/100 |
| 2008/0224515 | A1 * | 9/2008 | Cui et al. | 297/256.12 |

* cited by examiner

ADJUSTABLE FRAME TO SUPPORT FLEXIBLE BODIES

BACKGROUND

The invention relates to adjustable frames to support flexible bodies and more particularly to adjustable frames for use supporting different shapes of flexible bodies.

Uses for frames having variable dimensions are manifold to support flexible material is desired to provide a system that occupies less volume when stored, as compared to the volume occupied when in use. For example, frames used to support a flexible canopy, such as a canopy fabricated from cloth, are made to be collapsible, because it is desired that the area of the canopy typically requires that the frame require a volume much greater when used than that desired to be occupied when stored.

U.S. Pat. Nos. 4,641,676 and 5,421,356 both to Lynch disclose portable canopy structures that may be erected from a collapsed state to an expanded state that shelters a desired surface. The canopy structure includes a dome-like covering that is held in position by a support framework having a plurality of upright support members that are interconnected by a plurality of scissor assemblies. Each upright support member slideably mounts a slide bracket, and a rigid bracket is mounted at its top. The scissor assemblies are connected to these brackets. Preferably the structure is in the form of a parallelepiped, and an internal scissor assembly extends between two facing side scissor assemblies which interconnect the upright supports. The covering extends across the tops of the supports and has side panels that depend downwardly from its perimeter, and the internal scissor assembly supports a central post that helps support the covering. A screen may be positioned around the support structure and may be connected to and be downwardly dependent from the side panels. Guide cords may be provided for the upright support members.

U.S. Pat. No. 5,080,237 discloses an apparatus for holding flexible material exposed to water during a washing process. To that end, at least one bag is held in an inverted position to allow the bag to be sprayed with water for cleaning and then air dried. A support base, resting on a flat surface, has a top face with a plurality of engagement slots therein. At least one frame is included, each frame having two arms, each arm being segmented into two portions pivotally joined at their ends. The support base has two clips to hold at least one frame for compact storage and portability. The ends of each arm are adapted for engagement into said engagement slots. One portion of each arm is pivotally joined to the like portion of the other arm to allow the joined portions to move in scissor-like motion. The distal ends of each arm are adjusted so that the distance between the distal ends is approximately equal to the inside dimension of the bag, the bag being placed in an inverted position over the arms. Each portion of the arms around the points of pivotal joining have a roughened surface to permit two portions to frictionally engage each other and allow the arms to maintain a set position against minor forces. Each portion of the arms has an upset surface to permit two portions to engage each other to facilitate the setting of a preferred set position.

Thus, there is a need to provide adjustable frames to provide support for flexible bodies in a variety of situations.

BRIEF SUMMARY

The present invention provides an adjustable frame comprising a plurality of telescoping legs arranged in first and second pairs, with each leg of the first pair being rotatably coupled together and each leg of the second pair being rotatably coupled together; and a scissor link mechanism coupled between the legs of the first and second pairs to provide structural support and vary a length of the plurality of legs in response to a distance between the first and second pairs varying. In one embodiment one end of each of the legs of the first pair is rotatably coupled together and one end of each of the legs of the second pair is rotatably coupled together. In this manner, the dimensions of a frame may be varied to accommodate support of a flexible body, such as a plastic bag, paper sack, fabric sack and the like to provide the same with a desired volume and/or an opening of the same with desired dimensions. Specifically, the length of the legs, the angle therebetween and the distance between the first and second pairs may be such as to provide a desired volume to the flexible membrane from amongst range of volumes that the flexible material can support. This is useful for many applications, including the washing of flexible material configured as plastic bags in a dishwasher. These and other embodiments are discussed more fully below.

DETAILED DESCRIPTION

Figure 1:
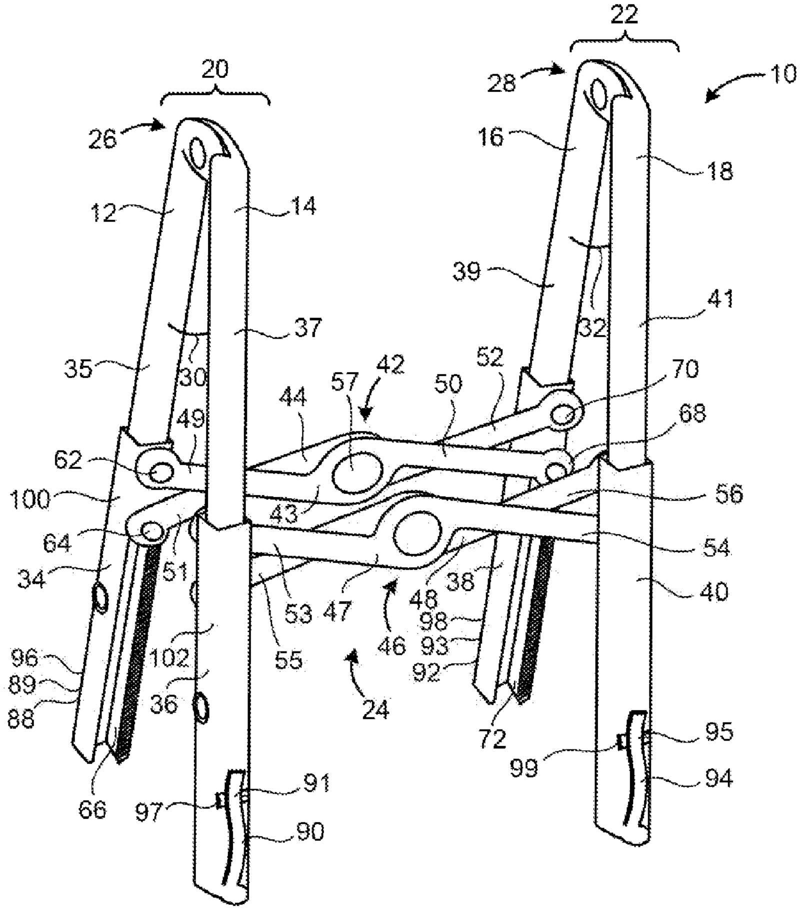
FIG. 1 is a perspective view of a frame in accordance with one embodiment in a fully extending position.

Referring to FIG. 1, a frame 10 includes a plurality of telescoping legs 12, 14, 16 and 18 arranged in pairs 20 and 22. Each of the legs 12, 14, 16 and 18 associated with one of pairs 20 and 22 are rotatably coupled together. A scissor link mechanism 24 is coupled between legs 12, 14, 16 and 18 of first and second pairs 20 and 22. One end of each of legs 12 and 14 of pair 20 is rotatably coupled together forming a pivot joint 26, and one end of each of the legs of pair 22 is rotatably coupled together forming a pivot joint 28. Pivot joint 26 facilitates adjusting an angle 30 between legs 12 and 14 of pair 20, and pivot joint 28 facilitates adjusting an angle 32 between legs 16 and 18 of pair 22.

Each of legs 12, 14, 16 and 18 includes a journal and a bearing received within the journal. As shown leg 12 includes journal 34 and bearing 35, leg 14 includes journal 36 and bearing 37, leg 16 includes journal 38 and bearing 39 and leg 18 includes bearing 41 and journal 40. Scissor link mechanism 24 is pivotally coupled between the bearing and journal of each leg 12, 14, 16 and 18.

Figure 2:
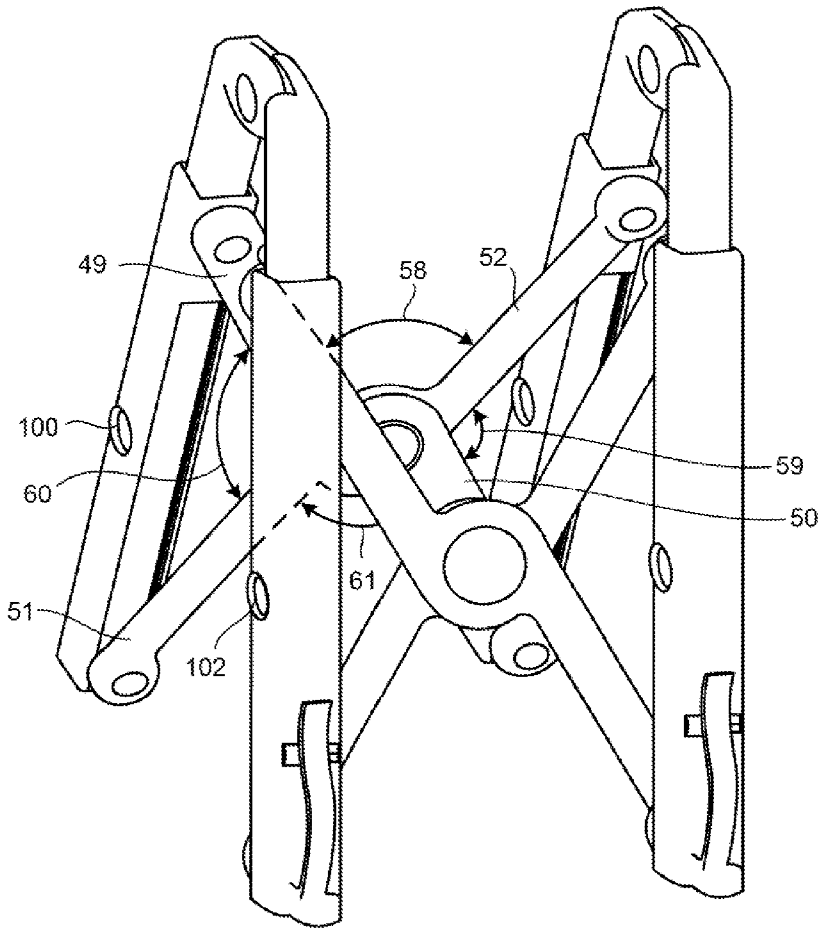
FIG. 2 perspective view of the frame shown in FIG. 1 in an intermediate extended position.

Referring to FIGS. 1 and 2, scissor link mechanism 24 includes a first pair 42 of pivotally connected couplers 43 and 44 and a second pair 46 of pivotally connected couplers 47 and 48. Each of couplers 43, 44, 47 and 48 includes a pair of arms extending in opposing directions therefrom. Coupler 43 includes arms 49 and 50, coupler 44 includes arms 51 and 52, coupler 47 includes arms 53 and 54, and coupler 48 includes arms 55 and 56. The arrangement of the couplers in any given pair 42 and 46 is discussed with respect to coupler 42 with the understanding that the discussion applies equally to coupler pair 46. Couplers 43 and 44 are configured to vary a magnitude of two angles formed between the two arms of coupler 43 and the two arms of coupler 44 when pair 42 rotates about an axis 57. As shown angle 58 is formed between arm 52 and arm 49. Angle 59 is formed between arm 52 and arm 50. Angle 60 is formed between arm 51 and arm 49, and angle 61 is formed between arm 51 and arm 50. As couplers 43 and 44 rotate about axis 57 one pair of angles 58 and 61 decreases and a remaining pair of angles 59 and 60 increases and vice versa. Specifically, the magnitude of angle pair 59 and 60 is inversely proportional to the magnitude of angle pair 58 and 61 when couplers 43 and 44 rotate about axis 57.

The rotational movement about axis 57 is transferred to linear motion in legs 12 and 16 to vary a length thereof. To that end, arm 49 is pivotally coupled to journal 34, and arm 50 is pivotally coupled to bearing 39. Specifically, a pivot pin 62 is attached to both arm 49 and journal 34 and allow rotational movement therebetween. A pivot pin 64 is attached to both arm 51 and bearing 35 and allows rotation movement therebetween. In addition, translational movement between pivot pin 64 and journal 34 is facilitated by a bearing race 66 formed into journal 34. This allows translational movement between bearing 35 and journal 34 to occur and rotational movement to both arm 51 and 49 with respect to leg 12. To constrict unwanted movement between bearing 35 and journal 34 it is desired that the shape of journal 34 be complementary to the shape of bearing 35 and that the cross-section area of bearing 35 is proximate to the cross section area of the volume of journal 34 in which bearing 35 is received. For similar reasons the diameter of pivot pin 64 matches the width of bearing race 66.

Figure 3:
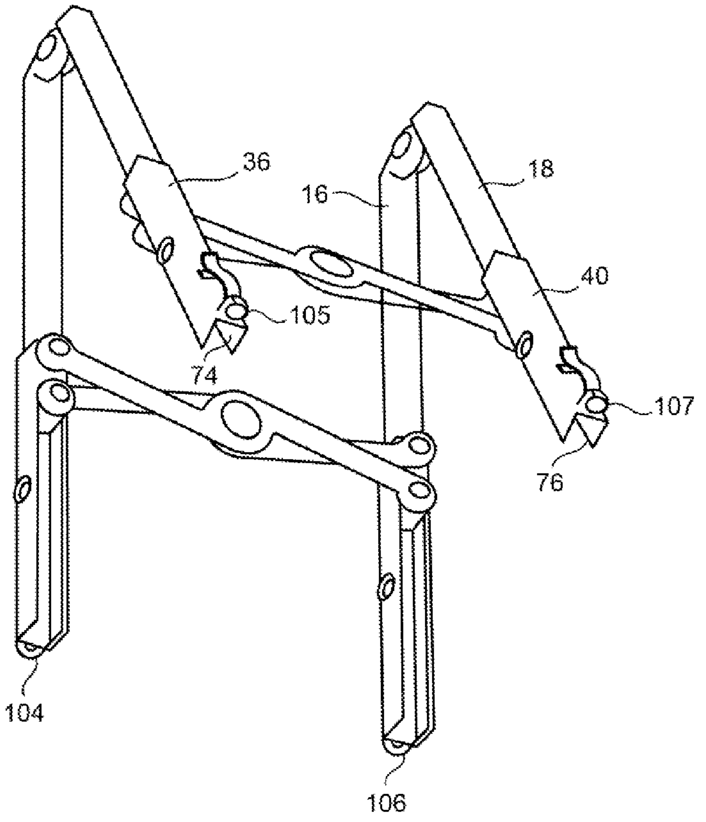
FIG. 3 is a bottom perspective view of the frame shown in FIG. 1.

Referring to both FIGS. 1 and 3, to facilitate the same movement between arms 50 and 52 with respect to leg 16, as discussed above with respect to arms 49 and 51 with respect to leg 12, arm 50 is attached to bearing 39 via pivot pin 68, and arm 52 is attached to journal 38 via pivot pin 70. Pivot pin 68 moves along a bearing race 72 formed into journal 38. The identical configuration is present with respect to coupler pair 46 and legs 14 and 18. Specifically, arm 53 is rotatably coupled to journal 36 with pivot pin (not shown), and arm 55 is rotatably coupled to bearing 37 with another pivot pin (not shown). Arm 56 is rotatably coupled to journal 40 with a pivot pin (not shown) and arm 54 is rotatably coupled to bearing 41 with a pivot pin (not shown). Each of pivot pins coupled to bearings 37 and 41 are disposed within a bearing race 74 and 76 of journal 36 and 40, respectively. In this manner, the same operational movement between coupler pair 46 and legs 14 and 18 may be achieved as discussed above with respect to coupler pair 42 and legs 12 and 16.

Figure 4:
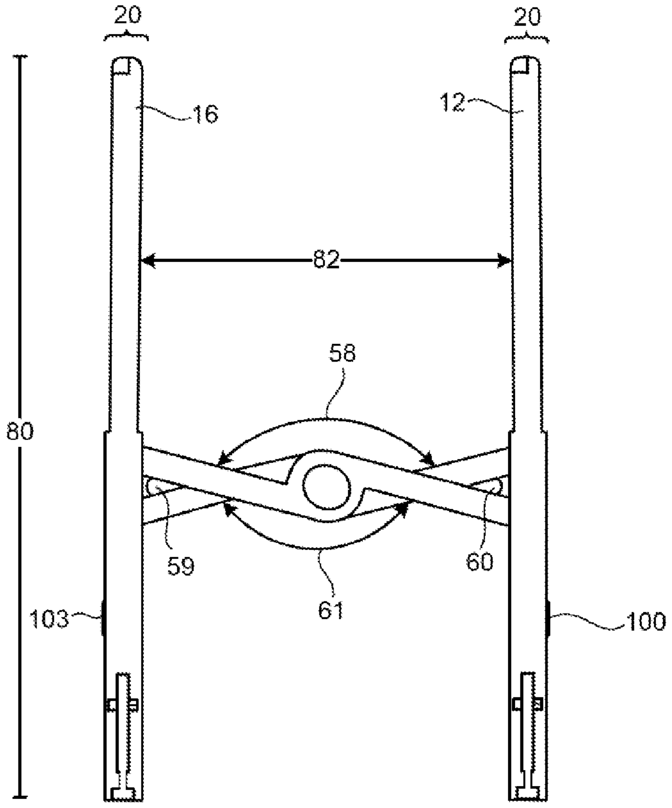
FIG. 4 is a front view of the frame shown in FIG. 1 in a fully extending position.
Figure 5:
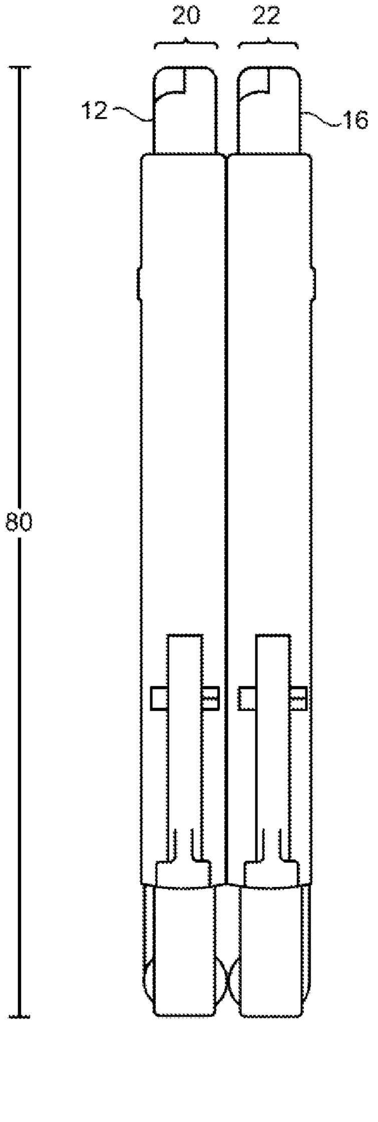
FIG. 5 is a front view of the frame shown in FIG. 4 in a fully collapsed position.

Referring to both FIGS. 1 and 4, the dimensions of frame 10 are established to achieve a desired function. To that end, a length 80 of leg pairs 20 and 22 may be established by varying a distance 82 between pairs 20 and 22. As shown, when angle 58 and 61 are at a maximum and angles 59 and 60 are at a minimum distance 82 and length 80 are at a maximum. It should be understood that the relative dimensions of bearings 39 and 35 and journals 34 and 38 are established so that the coupling therebetween is maintained when length 80 is maximized. When angles 59 and 60 are maximized and angles 58 and 61 minimized, distance 82 goes to zero, shown by pairs 20 and 22 touching, and length 80 is at a minimum, shown in FIG. 5.

Figure 6:
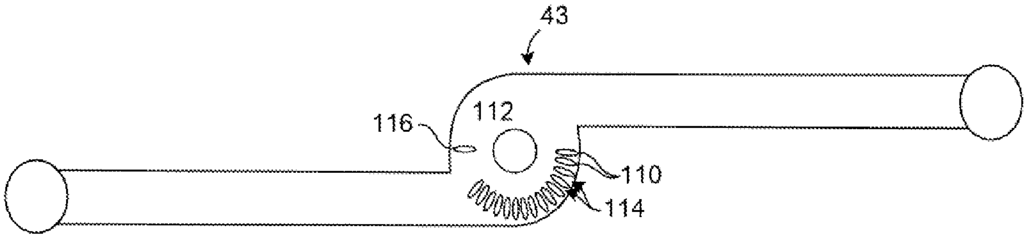
FIG. 6 is a detailed plan view of a coupler, shown in FIG. 1, in accordance with an alternate embodiment.

Referring to both FIGS. 1 and 6, to maintain the magnitude of angles 58-61 one or both pair 42 and 46 of couplers 43, 44, 47 and 48 it may be desirous, but not necessary, to include a ratchet mechanism that consists of a plurality of spaced-apart recesses 110 formed in surface 112 of the coupler, shown with respect to coupler 43. Also included on coupler 43 is a detent 116. Detent 116 has dimensions that are complementary to the recesses (not shown) formed on coupler 44 so that the same may be received therein forming an interference fit therewith. Similarly, a detent (not shown) included in coupler 44 has dimensions that are complementary to the recesses 110 so that the same may form an interference fit therewith. In this manner, distance 82 between legs 12, 14 of pair 20 and legs 16 and 18 of pairs 22 may be changed by to a desired magnitude and maintained thereat vis-à-vis scissor link 24. In this sense ratcheting hinge allows movement in two directions to incrementally change the distance between leg pairs 20 and 22. It may be desirous, but not necessary, to maintain the magnitude of the angle between legs 12, 14 of pair 20 and legs 16 and 18 of pairs 22 by a ratcheting hinge.

Figure 7:
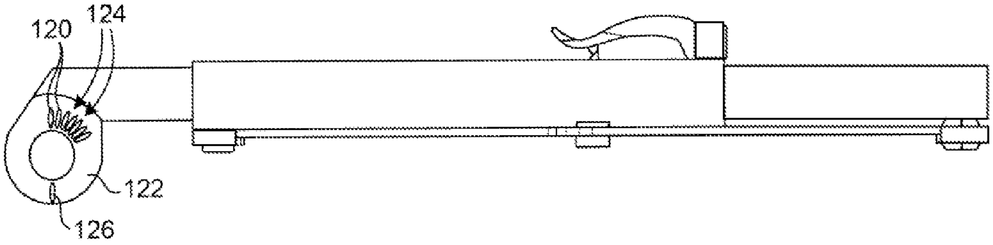
FIG. 7 is a detailed plan view of a pivot joint, shown in FIG. 1, in accordance with an alternate embodiment.

Referring to both FIGS. 1 and 7, the ratchet hinge is discussed with respect to pivot joint 28 and applies equally to pivot joint 26. Specifically, ratcheting hinge allows incrementally adjusting the position between legs 12, 14 of pair 20 and legs 16 and 18 of pair 22. To that end, ratcheting hinge includes a plurality of spaced-apart recesses 120 formed into a surface 122 of leg 18 and a detent 126 extending therefrom. Detent 126 has dimensions that are complementary to the recesses (not shown) formed on leg 16 so that the same may be received therein forming an interference fit therewith. Similarly, a detent (not shown) included in leg 16 has dimensions that are complementary to the recesses 120 so that the same may form an interference fit therewith. In this manner, the relative angular positions between legs 12 and 14 of pair 20 and legs 16 and 18 of pairs 22 may be changed by pivot joints 26 and 28, respectively. In this sense ratcheting hinge allows movement in two directions to incrementally change the angular position between legs 12 and 14 of pair 20 and leg 16 and 18 of pair 22.

The magnitudes of angles 30, 32 and 58-61 establish a volume space occupied by frame 10. This facilitates multiple volume dimensions and uses of frame 10 and enables storage of the same by minimizing the volume occupied by the same when not is use. In a storage configuration angles 30, 32, 58 and 61 are minimized thereby providing the frame with the smallest volume.

In operation establishing angles 30 and 32 and 58-61 to have a desired magnitude, frame 10 may be used as a support for different sizes and shapes of flexible bodies. In accordance with one embodiment frame 10 is suitable for use as a means for making flexible bodies suitable for re-use, such as the washing of bags used for storage and transporting of foodstuffs, e.g., plastic sandwich bags and zipper storage bags such as the type sold under the trademark ZIPLOC®. One manner in which to wash bags would be using frame in an automatic washing system (AWS) (not shown), commonly referred to as a dishwasher. In this example, frame 10 would be placed in an AWS (not shown) such that the journals 34, 36, 38 and 40 would attach to a bottom or top AWS rack (not shown) or surface thereof from whence water and detergent would be injected by the AWS (not shown). As a result, water from the AWS (not shown) typically is projected toward pivot joints 26 and 28. Angles 30 and 32 are typically established to ensure that a distance between journals 34 and 36 and a distance between journals 38 and 40 is sufficient to maximize the area of the opening of bag. In addition to angles 30 and 32, angles 58-61 are also established to provide length 80 and width 82 of sufficient magnitude to provide rigid internal support to varying size of volumes of plastic bags; thus, increasing the probability that the area of the inner surface of the bag is exposed to water and detergent during the normal AWS wash-cycles.

One concern with respect to use of frame in an AWS (not shown) is securely fastening the bag, in an inverted position, to frame 10. To that end, each journal 34, 36, 38 and 40 includes a bag keeper, shown as 88, 90, 92 and 94. Each bag keeper 88, 90, 92 and 94 is integrally formed with bearing 34, 36, 38 and 40, respectively with one end forming a clamp 89, 91, 93 and 95. Each clamp 89, 91, 93 and 95 is resilient biased against one of journal 34, 36, 38 and 40, respectively. In this manner, a portion of the bag may be disposed between one of the clamps and journal member with the clamp forming interference fit therewith securely affixing the bag to frame 10. To increase the force per unit area applied to the bag one or more of clamps 89, 91, 93 and 95 include a projection that extends across each journal 34, 36, 38 and 40. This is shown as projection 97 and 99 extending across bearing 36 and 40, respectively. Each projection 97 and 99 is positioned proximate to clamp 91 and 95, respectively, so that the bag may be wedged therebetween. Projections 96 and 98 facilitate the same for clamps 89 and 93, located on bearings 34 and 38, respectively.

To facilitate use in an AWS, frame 10 is typically fabricated from a polymer compound, such as injection molded plastic. The simplicity of the design makes frame cost efficient for manufacture, because bearings 35 and 39, 37 and 41 have identical shapes. All journal members 34, 36, 38 and 40 have identical shapes and all couplers 43, 44, 47 and 48 have identical shapes. Thus, the mold (not shown) employed to fabricate frame need not be complicated.

Referring to FIGS. 1, 2 and 4, as an alternative, a plurality of magnetic bodies may be embedded in various parts of frame 10. The magnetic bodies may be placed virtually any where on frame 10. However, it is desired that the magnetic bodies be placed so as to facilitate affixing frame 10 to a metal surface when in a storage configuration. To that end, each journal 34, 36, 38 and 40 includes a magnetic body mounted on a surface of journal 34, 36, 38 and 40 facing away from an adjacent journal 34, 36, 38 and 40 attached to a common coupler pair 42 and 46. This is shown by magnetic bodies 100, 102 and 103 attached to journals 34, 36 and 38, respectively. A magnetic body may also be attached to journal 40. It is desired that magnetic bodies be flush with or slight recessed within the portion of surface of journals 34, 36, 38 and 40. In one example, a storage plate (not shown) may be employed to facilitate storing of frame 10. The storage plate (not shown) may be a circular thin gauge magnetically responsive metal disc (not shown) having adhesive backing. The adhesive may be used to attach the plate (not shown) to a surface and frame 10 magnetically adhered thereto.

Magnetic bodies may also be present on one end of bag keeper 88, 90, 92 and 94, shown as 104-107 in FIG. 3. The magnetic bodies are placed so as to facilitate affixing frame 10, with attached soiled flexible body, to either the top or bottom AWS (not shown) rack or attach to any other magnetically responsive material. Magnetic bodies 104-107 are in place to facilitate the secure attachment and positioning of frame 10 in the AWS (not shown). Secure attachment and upright positioning of frame 10 is desired to achieve an appropriate wash and desired wash while avoiding undesirable movement of frame 10 and/or flexible body attached to frame 10, i.e., being tossed-about the AWS. Magnetic bodies 104-107 and keepers 88, 90, 92 and 94 are positioned so as to securely hold a soiled flexible body in an inverted position to allow the same to be fully sprayed with water and detergent for cleaning and then server as a rack for air drying either inside or outside the AWS. Magnetic bodies serve as easy coupling mechanisms to facilitate easy placement and removal from ASW (not shown). Frame 10 is not necessarily permanently or semi-permanently attached to the AWS.

Another example for the use of frame would be to support different garments for advertising, such as shirts, blouses, trousers and the like. By adjusting angles 26 and 28, as well as length 80 and width 82, frame 10 may be suitable for displaying garments of different sizes and to provide different appearances, such as full-figure, slim and intermediate, dependent upon the volume to which the flexible material is expanded by frame 10. To that end, flexible material is typically fitted over frame 10 with the journals 34, 36, 38 and 40 forming a base of frame and pivot joints 26 and 28 forming a top of frame 10 over which the flexible material is placed. Of course such use of frame would obviate an advantage to fabricate the same from water resistant material and could vitiate the need to have bag keepers 88, 90, 92 and 94.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. For example, a ratcheting mechanism and ratcheting hinge are discussed with respect to maintaining the relative position between different components of the invention. However, it may be that the ratcheting mechanism and/or the ratcheting hinge may be replaced by abrogating the detents and merely providing roughened surfaces in place thereof. Therefore, the scope of the appended claims should be accorded the broadest interpretation so as to encompass all such modifications and similar arrangements.

The invention claimed is:

1. A frame for supporting a bag thereon, the frame comprising:

- a plurality of telescoping legs arranged in a first pair and a second pair, the legs of said first pair being rotatably connected together at an upper end thereof, the legs of said second pair being rotatably connected together at an upper end thereof;
- a scissor link mechanism coupled between the legs of said first and second pairs so as to vary a length of said plurality of legs in response to a distance between a lower end of said first and second pairs, each of said plurality of telescoping legs comprising:
  - a journal having an interior passageway; and
  - a bearing slidably received in said interior passageway of said journal, the bearing of the leg of said first pair being pivotally connected the bearing of another leg of said first pair of an upper end thereof, said scissor link mechanism being pivotally connected to said journal and pivotally connected to a portion of said bearing within said interior passageway of said journal.

2. The frame of claim 1, said scissor link mechanism varying a length of said plurality of legs proportionally to a change of the distance between the lower ends of said first and second pairs.

3. The frame of claim 1, said scissor link mechanism having a pair of couplers pivotally connected together, each of said pair of couplers having a pair of arms extending in opposite directions from the coupler, one arm of said pair of arms pivotally coupled to one of the legs of said first pair and another arm of said pair of arms pivotally coupled to one of the legs of said second pair.

4. The frame of claim 1, said scissor link mechanism having a first pair of couplers and a second pair of couplers, the couplers of said first and second pairs being pivotally connected and having a pair of arms extending in opposite directions therefrom, one arm of said pair of arms being pivotally coupled to one of the legs of said first pair and another arm of said pair of arms being pivotally coupled to one of the legs of said second pair.

5. The frame of claim 1, the legs of said first pair being rotatably connected together with a ratcheting hinge to selectively fix an angle between the legs of said first pair.

* * * * *